United States Patent
Di Pietro et al.

(10) Patent No.: US 9,006,341 B2
(45) Date of Patent: *Apr. 14, 2015

(54) POLYOLEFIN FIBRES

(75) Inventors: Fabio Di Pietro, Ferrara (IT); Roberto De Palo, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 371 days.

This patent is subject to a terminal disclaimer.

(21) Appl. No.: 13/132,099

(22) PCT Filed: Dec. 3, 2009

(86) PCT No.: PCT/EP2009/066278
§ 371 (c)(1),
(2), (4) Date: Jun. 1, 2011

(87) PCT Pub. No.: WO2010/069775
PCT Pub. Date: Jun. 24, 2010

(65) Prior Publication Data
US 2011/0238027 A1 Sep. 29, 2011

Related U.S. Application Data

(60) Provisional application No. 61/203,589, filed on Dec. 23, 2008.

(30) Foreign Application Priority Data

Dec. 19, 2008 (EP) ..................................... 08172332

(51) Int. Cl.
| C08F 8/00 | (2006.01) |
| C08L 23/04 | (2006.01) |
| C08L 23/10 | (2006.01) |
| C08L 23/12 | (2006.01) |
| C08L 23/20 | (2006.01) |
| D01F 6/46 | (2006.01) |

(52) U.S. Cl.
CPC ................. *C08L 23/12* (2013.01); *C08L 23/10* (2013.01); *C08L 23/20* (2013.01); *C08L 2205/02* (2013.01); *D01F 6/46* (2013.01)

(58) Field of Classification Search
CPC ......... C08L 23/10; C08L 23/12; C08L 23/20; C08L 2205/02; C08L 2666/06; D01F 6/46
USPC .................................................. 525/191, 240
See application file for complete search history.

(56) References Cited

U.S. PATENT DOCUMENTS

| 5,773,515 | A * | 6/1998 | Srinivasan et al. ............ 525/240 |
| 6,949,614 | B1 | 9/2005 | Schottek |
| 6,953,829 | B2 | 10/2005 | Kratzer |
| 7,101,940 | B2 | 9/2006 | Schottek |
| 7,390,862 | B2 | 6/2008 | Resconi |
| 7,674,734 | B2 * | 3/2010 | Suzuki et al. ................. 442/401 |
| 8,227,550 | B2 | 7/2012 | Masarati et al. |
| 8,304,487 | B2 | 11/2012 | Malacarne et al. |
| 2010/0136133 | A1 | 6/2010 | Moore et al. |
| 2011/0190450 | A1 * | 8/2011 | De Palo et al. ................ 525/240 |

FOREIGN PATENT DOCUMENTS

| CN | 101087844 | 12/2007 |
| EP | 527589 | 2/1993 |
| EP | 0633272 | 1/1995 |
| EP | 0775707 | 5/1997 |
| EP | 1211287 | 6/2002 |
| JP | H01-246413 | 10/1989 |
| JP | 2002-322213 | 11/2002 |
| JP | 2003-238750 | 8/2003 |
| JP | 2006-526042 | 11/2006 |
| JP | 2007-500761 | 1/2007 |
| JP | 2010-500428 | 1/2010 |
| JP | 2011-527346 | 10/2011 |
| WO | WO-91/02012 | 2/1991 |
| WO | WO-92/00333 | 1/1992 |
| WO | WO-93/06168 | 4/1993 |
| WO | WO-95/32995 | 12/1995 |
| WO | WO-00/63471 | 10/2000 |
| WO | WO-01/62764 | 8/2001 |
| WO | WO-2005/005495 | 1/2005 |
| WO | WO-2005/111282 | 11/2005 |
| WO | WO-2006/042815 | 4/2006 |
| WO | WO2008/017525 | 2/2008 |
| WO | WO2008/074715 | 6/2008 |
| WO | WO-2009/080435 | 7/2009 |
| WO | WO2010-034684 | 4/2010 |

* cited by examiner

*Primary Examiner* — Nathan M Nutter

(57) ABSTRACT

A polyolefin composition comprising:
A) 20-95 wt % of a propylene homo-polymer or a crystalline co-polymer of propylene with ethylene and/or an alpha-olefin having 4-10 carbon atoms, containing 85 wt % or more of propylene, having an isotactic index equal to or higher than 80;
B) 5-80 wt % of a copolymer of butene-1 with ethylene and/or an alpha-olefin having 3-10 carbon atoms having:
a content of butene-1 derived units of 80 wt % wt or more,
molecular weight distribution Mw/Mn of less than 3
flexural modulus of 60 MPa or less.
Fibres and spun bond (woven non woven), disposable sanitary items (e.g. diapers) thereof.

6 Claims, No Drawings

POLYOLEFIN FIBRES

This application is the U.S. national phase of International Application PCT/EP2009/066278, filed Dec. 3, 2009, claiming priority to European Application 08172332.2 filed Dec. 19, 2008 and the benefit under 35 U.S.C. 119(e) of U.S. Provisional Application No. 61/203,589, filed Dec. 23, 2008; the disclosures of International Application PCT/EP2009/066278, European Application 08172332.2 and U.S. Provisional Application No. 61/203,589, each as filed, are incorporated herein by reference.

The present invention relates to polyolefin fibres, articles produced from said fibres and a polyolefin composition for the preparation of the said fibres. In particular, the invention concerns a polyolefin composition exhibiting a good balance between mechanical properties, more particularly good tenacity and elongation at break, elastic recovery after deformation combined with improved thermal bonding properties, on the fibres produced from it. More specifically, the invention relates to a composition made from a homogeneous propylene polymer blended with a butene-1 copolymer material having from elastomeric to plastomeric behaviour.

The definition for fibres includes spunbond fibres and/or filaments.

The polyolefin fibres of the present invention are particularly adequate for soft non-woven fabrics for application requiring both elasticity (elastic recovery) and tenacity such as disposable diapers that can be produced in a reduced number of sizes or even single size.

It is known in the prior art that a propylene polymer plastomer or elastomer can be blended with a propylene polymer resin and the composition thus obtained is used to produce fibres having a good balance of tenacity and elasticity. The international application WO2005/111282 A1 (Dow) discloses soft and abrasion resistant non woven webs or fabrics comprising fibres made from blends of isotactic propylene and reactor grade propylene based elastomer or plastomers. No butene-1 polymers are added to the blends.

The international application WO93/06168 A1 (Exxon) discloses blends comprising crystalline polypropylene with a poly(1-butene) (commercialized by Shell under the tradename 600SA) used for the manufacture of fibres balancing the strength properties of propylene with the fabric-hand provided by poly(1-butene) having a density from about 0.89 to about 0.92 g/cm$^3$ and MFR from 1-100 dg/min. The document remains silent about elastic properties and thermal bonding properties of the fibres obtained by such blends.

Now it has surprisingly been found that by blending butene-1 copolymers into a homogenous propylene polymer resin according to the present invention, a polyolefin composition is obtained which can be transformed into fibres having improved balance of properties in comparison with the fibres produced with the resin alone and also with respect to known blend comprising propylene based copolymers plastomers and elastomers. Particularly high values of tenacity are preserved and still good elongation at break and tenacity are exhibited by the composition of the present invention together with maintained or improved elastic recovery and improved thermal bonding forces.

As above said an advantage of the present invention is that softness of the fibres and, consequently, of the non-woven fabrics thereof is also increased when producing calendered items (spunbond non-woven) due to the improved thermal bonding that enables also acceleration of cycle time in production and/or reduction of the calendering temperature maintaining the needed bonding strength without deterioration of softness and elasticity of the item. Users will particularly appreciate that certain articles, in particular disposable sanitary articles, exhibit adequate softness combined with good tear resistance and tenacity.

Therefore, an embodiment of the present invention is a polyolefin composition comprising (percentage by weight relative to the total amount of component A and B):

A) 20-95 wt %, preferably 40-95 wt %, more preferably 55-90 wt %, even more preferably from 65 to 75 wt %, of a propylene homo-polymer with an isotactic index (percentage by weight of fraction insoluble in boiling n-heptane) higher than 80, preferably between 90 and 98, or of a crystalline co-polymer of propylene with ethylene and/or an alpha-olefin having 4-10 carbon atoms, containing 85 wt % or more of propylene and having an isotactic index equal to or higher than 80;

B) 5-80 wt %, preferably 5-60 wt %, more preferably 10-45 wt %, even more preferably from 25 to 35 wt %, of a copolymer of butene-1 with ethylene and/or an alpha-olefin having 3-10 carbon atoms having:
a content of butene-1 derived units of 80 wt % wt or more,
molecular weight distribution Mw/Mn of less than 3
flexural modulus (MEF) of 60 MPa or less, preferably of 40 MPa or less, more preferably 30 MPa or less.

The term "copolymer" as used herein refers to both polymers with two different recurring units and polymers with more than two different recurring units in the chain, such as terpolymers.

Another embodiment according to the present invention is therefore a fibre made from the said polyolefin composition.

The fibres according to the present invention typically exhibit softness, and elastic recovery improved or maintained with respect to the values of polymer (A) alone. Particularly surprisingly tenacity is not substantially deteriorated with respect to polymer (A) alone. An improved thermal bonding force with maintained or even improved elastic recovery contributes to the advantageous balance of properties. Typically the tenacity of the fibre is diminished by less then 25%, preferably less then 20%, more preferably less then 10% with respect to the tenacity of a fibre obtained in the same spinning conditions with component (A) alone.

The above propylene homo or co-polymer component (A) preferably has a value of melt flow rate from 10 to 50, more preferably from 20 to 35 g/10 min measured according to ISO 1133 at 230° C., 2.16 Kg. As it is known, high MFR values are obtained directly in polymerization or by controlled radical degradation of the polymer by adding free-radical generators, such as organic peroxides, in the spinning lines or during previous pelletizing stages of the olefin polymers.

The polymer component (A) preferably exhibits a molecular weight distribution (Mw/Mn) measured according to the method specified below, ranging from 2 to 8.

In particular when polymer component (A) is produced with a Ziegler Natta catalyst Mw/Mn is in the range 3 to 4, preferably from 3.2 to 3.4.

In particular when polymer component (A) is produced with a metallocene catalyst Mw/Mn is in the range from 2 to 3, preferably from 2.4 to 2.6.

The polymer component (A) exhibits a stereoregularity of the isotactic type. It is either a propylene homopolymer or a random polymer of propylene with an α-olefin selected from ethylene and a linear or branched $C_4$-$C_8$ α-olefin, such as copolymers and terpolymers of propylene. Polymer resin (A) can also be mixtures of the said polymers, in which case the mixing ratios are not critical. Preferably, the α-olefin is selected from the class consisting of ethylene, 1-butene, 1-pentene, 1-hexene, 1-heptene, 1-octene, 1-nonene, 1-decene and 4-methyl-1-pentene. The preferred amount of comonomer content ranges up to 15% by weight.

The copolymer component (B) according to the present invention has from elastomeric to plastomeric behaviour and is also referred to as "plastomer". Component (B) exhibit low flexural modulus and preferably also:
low crystallinity (less than 40% measured via X-ray, preferably less than 30%) and
low hardness shore A (ISO 868) of less than 90,
tension set lower than 30% at 100% of deformation (ISO 2285) preferably lower than 20%;

Component (B) have preferably no melting point (TmII) detectable at the DSC measured according to the DSC method described herein below, but can have a measurable melting enthalpy after aging. Particularly, measured after 10 days of aging at room temperature, the melting enthalpy of (B) can be of less than 25 J/g, preferably of from 4 to 20 J/g.

Preferably, the copolymer component (B) is chosen among copolymers of butene-1 with ethylene and terpolymers of butene-1 with propylene and ethylene. Particularly preferred as copolymer component (B) is:
(B1) a butene-1 ethylene copolymer having a content ethylene derived units ranging from 5% to 10% by weight (15.10% by mol to 18.00% by mol), preferably from 15.50% by mol to 16.50% by mol having preferably the following properties:
a) hardness shore A (measured according to ISO 868) lower than 65; preferably lower than 60
b) melting enthalpy, measured after 10 days of aging at room temperature measured according to the methods described in this document, comprised between 4 and 15 J/g; preferably between 5 and 10 J/g;
Even more preferred as component (B) is:
(B2) a butene-1/ethylene/propylene terpolymer having a content of from 3 to 10 wt % (7.5% by mol to 18% by mol), preferably from 4 to 8 wt % (7.5% by mol to 15% by mol), of ethylene derived units in the polymer chain, and from 2 to 10 wt % (2.51% by mo to 12% by mol), preferably from 4 to 7 wt % (5% by mol to 8.5% by mol) of propylene derived units in the polymer chain;
the said terpolymer (B2) having preferably the following properties:
a) hardness shore A values (measured according to ISO 868) lower than 90; preferably lower than 85, and
b) melting enthalpy, measured after 10 days of aging at room temperature according to the methods described in this document, of from 12 and 20 J/g; preferably from 14 to 18 J/g The propylene homo or co-polymer component (A) can be produced by conventional processes polymerizing propylene and, optionally, an α-olefin mentioned above in the presence of an opportune catalyst, such as a stereospecific Ziegler-Natta catalysts or a metallocene catalyst.

The polymer component (A) obtained by metallocene based catalyst are preferably obtained by using as metallocene compound a bridged benzoindenyl zirconium dichloride. Said compound is then supported on Silica and activated by using an alumoxane, preferably methylalumoxane, according to the procedure known in the art. The propylene polymer are obtained with a process in slurry by using propylene monomer as diluent and two reactor in series. An example of such kind of process and catalyst is found in the International patent application WO2005/005495 A1.

The propylene polymer (A) obtained by polymerising propylene in the presence of a stereospecific Z/N catalyst using the liquid monomer (propylene) as a diluent. The stereospecific Ziegler-Natta catalysts comprise a solid catalyst component comprising at least one titanium compound having at least one titanium-halogen bond and at least an electron-donor compound (internal donor), both supported on magnesium chloride compound. The Ziegler-Natta catalyst systems further comprise an organo-aluminum compound as essential co-catalyst and optionally an external electron-donor compound. Preferably, the internal electron donor compound is selected from 1,3-diethers. As mentioned above, it is preferable to carry out the polymerization process in liquid phase, using the liquid propylene as the main diluent (bulk polymerization). Preferably, the bulk polymerization is carried out in one or more loop reactors which are connected in series. An example of such kind of process and catalyst is found in the International patent application WO2006/042815 A1.

The butene-1 copolymer component (B) can be obtained by contacting under polymerization conditions butene-1 and ethylene and eventually propylene in the presence of a catalyst system obtainable by contacting:
(A) a stereorigid metallocene compound;
(B) an alumoxane or a compound capable of forming an alkyl metallocene cation; and, optionally,
(C) an organo aluminum compound.

Preferably the stereorigid metallocene compound (A) belongs to the following formula (I):

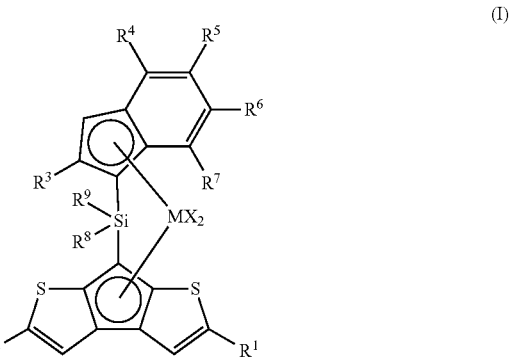

wherein:

M is an atom of a transition metal selected from those belonging to group 4; preferably M is zirconium;

X, equal to or different from each other, is a hydrogen atom, a halogen atom, a R, OR, OR'O, OSO2CF3, OCOR, SR, NR2 or PR2 group wherein R is a linear or branched, saturated or unsaturated C1-C20-alkyl, C3-C20-cycloalkyl, C6-C20-aryl, C7-C20-alkylaryl or C7-C20-arylalkyl radical, optionally containing heteroatoms belonging to groups 13-17 of the Periodic Table of the Elements; and R' is a C1-C20-alkylidene, C6-C20-arylidene, C7-C20-alkylarylidene, or C7-C20-arylalkylidene radical; preferably X is a hydrogen atom, a halogen atom, a OR'O or R group; more preferably X is chlorine or a methyl radical;

R1, R2, R5, R6, R7, R8 and R9, equal to or different from each other, are hydrogen atoms, or linear or branched, saturated or unsaturated C1-C20-alkyl, C3-C20-cycloalkyl, C6-C20-aryl, C7-C20-alkylaryl or C7-C20-arylalkyl radicals, optionally containing heteroatoms belonging to groups 13-17 of the Periodic Table of the Elements; or R5 and R6, and/or R8 and R9 can optionally form a saturated or unsaturated, 5 or 6 membered rings, said ring can bear C1-C20 alkyl radicals as substituents; with the proviso that at least one of R6 or R7 is a linear or branched, saturated or unsaturated C1-C20-alkyl radical, optionally containing heteroatoms belonging to groups 13-17 of the Periodic Table of the Elements; preferably a C1-C10-alkyl radical;

preferably R1, R2, are the same and are $C_1$-$C_{10}$ alkyl radicals optionally containing one or more silicon atoms; more preferably R1 and R2 are methyl radicals;

R8 and R9, equal to or different from each other, are preferably C1-C10 alkyl or C6-C20 aryl radicals; more preferably they are methyl radicals;

R5 is preferably a hydrogen atom or a methyl radical; or can be joined with R6 to form a saturated or unsaturated, 5 or 6 membered rings, said ring can bear C1-C20 alkyl radicals as substituents;

R6 is preferably a hydrogen atom or a methyl, ethyl or isopropyl radical; or it can be joined with R5 to form a saturated or unsaturated, 5 or 6 membered rings as described above;

R7 is preferably a linear or branched, saturated or unsaturated C1-C20-alkyl radical, optionally containing heteroatoms belonging to groups 13-17 of the Periodic Table of the Elements; preferably a C1-C10-alkyl radical; more preferably R7 is a methyl or ethyl radical; otherwise when R6 is different from a hydrogen atom, R7 is preferably a hydrogen atom R3 and R4, equal to or different from each other, are linear or branched, saturated or unsaturated C1-C20-alkyl radicals, optionally containing heteroatoms belonging to groups 13-17 of the Periodic Table of the Elements; preferably R3 and R4 equal to or different from each other are C1-C10-alkyl radicals; more preferably R3 is a methyl, or ethyl radical; and R4 is a methyl, ethyl or isopropyl radical;

Preferably the compounds of formula (I) have formula (Ia) or (Ib):

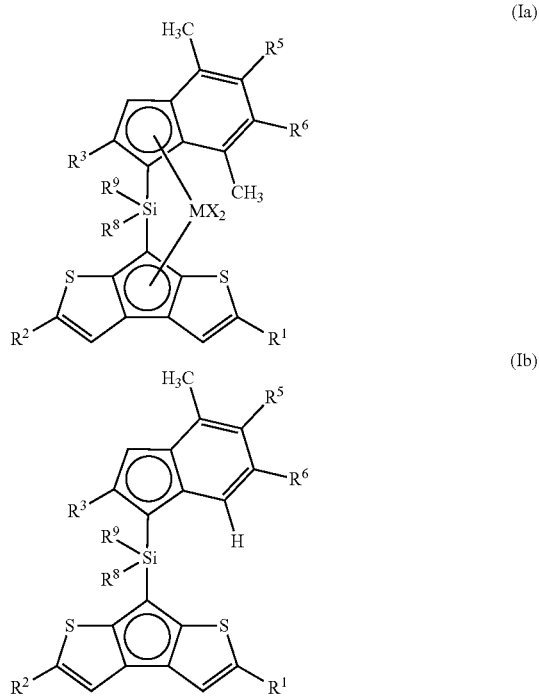

Wherein
M, X, R1, R2, R5, R6, R8 and R9 have been described above;
R3 is a linear or branched, saturated or unsaturated C1-C20-alkyl radical, optionally containing heteroatoms belonging to groups 13-17 of the Periodic Table of the Elements; preferably R3 is a C1-C10-alkyl radical; more preferably R3 is a methyl, or ethyl radical.

Alumoxanes used as component (B) can be obtained by reacting water with an organo-aluminium compound of formula HjAlU3-j or HjAl2U6-j, where U substituents, same or different, are hydrogen atoms, halogen atoms, C1-C20-alkyl, C3-C20-cyclalkyl, C6-C20-aryl, C7-C20-alkylaryl or or C7-C20-arylalkyl radical, optionally containing silicon or germanium atoms with the proviso that at least one U is different from halogen, and j ranges from 0 to 1, being also a non-integer number. In this reaction the molar ratio of Al/water is preferably comprised between 1:1 and 100:1. The molar ratio between aluminium and the metal of the metallocene generally is comprised between about 10:1 and about 20000:1, and more preferably between about 100:1 and about 5000:1. The alumoxanes used in the catalyst according to the invention are considered to be linear, branched or cyclic compounds containing at least one group of the type:

wherein the substituents U, same or different, are described above.

In particular, alumoxanes of the formula:

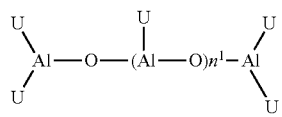

can be used in the case of linear compounds, wherein n1 is 0 or an integer from 1 to 40 and the substituents U are defined as above, or alumoxanes of the formula:

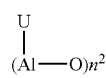

can be used in the case of cyclic compounds, wherein n2 is an integer from 2 to 40 and the U substituents are defined as above. Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO). Particularly interesting cocatalysts are those described in WO 99/21899 and in WO01/21674 in which the alkyl and aryl groups have specific branched patterns. Non-limiting examples of aluminium compounds according to WO 99/21899 and WO01/21674 are: tris (2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2, 3,3-trimethyl-pentyl)aluminium, tris(2,3,3-trimethyl-hexyl) aluminium, tris(2-ethyl-3,3-dimethyl-butyl)aluminium, tris (2-ethyl-3,3-dimethyl-pentyl)aluminium, tris(2-isopropyl-3, 3-dimethyl-butyl)aluminium, tris(2-trimethylsilyl-propyl) aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris [2-(4-fluoro-phenyl)-propyl]aluminium, tris [2-(4-chloro-phenyl)-propyl]aluminium, tris [2-(3-isopropyl-phenyl)-propyl]aluminium, tris(2-phenyl-butyl)aluminium, tris (3-methyl-2-phenyl-butyl)aluminium, tris(2-phenyl-pentyl) aluminium, tris [2-(pentafluorophenyl)-propyl]aluminium, tris [2,2-diphenyl-ethyl]aluminium and tris [2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBAL), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula D+E−, wherein D+ is a Brønsted acid, able to donate a proton and to react irreversibly with a substituent X of the metallocene of formula (I) and E− is a compatible anion, which is able to stabilize the active catalytic species originating from the reaction of the two compounds, and which is sufficiently labile to be able to be removed by an olefinic monomer. Preferably, the anion E− comprises of one or more boron atoms. More preferably, the anion E− is an anion of the formula BAr4(−), wherein the substituents Ar which can be identical or different are aryl radicals such as phenyl, pentafluorophenyl or bis (trifluoromethyl)phenyl. Tetrakis-pentafluorophenyl borate is particularly preferred examples of these compounds are described in WO 91/02012. Moreover, compounds of the formula BAr3 can conveniently be used. Compounds of this type are described, for example, in the published International patent application WO 92/00333. Other examples of compounds able to form an alkylmetallocene cation are compounds of formula BAr3P wherein P is a substituted or unsubstituted pyrrol radicals. These compounds are described in WO01/62764. Other examples of cocatalyst can be found in EP-A-0 775 707 and DE 19917985. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula D+E− are:

Triethylammoniumtetra(phenyl)borate,
Trimethylammoniumtetra(tolyl)borate,
Tributylammoniumtetra(tolyl)borate,
Tributylammoniumtetra(pentafluorophenyl)borate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylaniliniumtetra(phenyl)borate,
N,N-Dimethylaniliniumtetrakis(pentafluorophenyl)boratee,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(phenyl)aluminate,
Ferroceniumtetrakis(pentafluorophenyl)borate,
N,N-Dimethylaniliniumtetrakis(pentafluorophenyl)borate.

Organic aluminum compounds used as compound C) are those of formula HjAlU3-j or HjAl2U6-j described above. The catalysts of the present invention can also be supported on an inert carrier. This is achieved by depositing the metallocene compound A) or the product of the reaction thereof with the component B), or the component B) and then the metallocene compound A) on an inert support such as, for example, silica, alumina, Al—Si, Al—Mg mixed oxides, magnesium halides, styrene/divinylbenzene copolymers, polyethylene or polypropylene. The supportation process is carried out in an inert solvent such as hydrocarbon for example toluene, hexane, pentane or propane and at a temperature ranging from 0° C. to 100° C., preferably the process is carried out at a temperature ranging from 25° C. to 90° C. or the process is carried out at room temperature.

A suitable class of supports which can be used is that constituted by porous organic supports functionalized with groups having active hydrogen atoms. Particularly suitable are those in which the organic support is a partially crosslinked styrene polymer. Supports of this type are described in European application EP-A-0 633 272. Another class of inert supports particularly suitable for use according to the invention is that of polyolefin porous prepolymers, particularly polyethylene.

A further suitable class of inert supports for use according to the invention is that of porous magnesium halides such as those described in International application WO 95/32995.

The process for the polymerization of butene-1 with ethylene and/or propylene or another alpha olefin according to the invention can be carried out in the liquid phase in the presence or absence of an inert hydrocarbon solvent, such as in slurry, or in the gas phase. The hydrocarbon solvent can either be aromatic such as toluene, or aliphatic such as propane, hexane, heptane, isobutane or cyclohexane. As a general rule, the polymerization temperature is generally comprised between −100° C. and +200° C. preferably comprised between 40° and 90° C., more preferably between 50° C. and 80° C. The polymerization pressure is generally comprised between 0, 5 and 100 bar.

The lower the polymerization temperature, the higher are the resulting molecular weights of the polymers obtained.

The polyolefin composition according to the present invention is prepared as follows. The butene-1 copolymer component (B) can be blended to polymer component (A) in neat form or, preferably, as part of a masterbatch, in such a case component (B) is previously dispersed in a propylene polymer resin that can be same as or different from polymer component (A). The concentrate thus prepared is then blended to polymer component (A).

The propylene polymer composition according to the present invention can be prepared according to conventional methods, for examples, mixing polymer component (A), component (B) or the concentrate thereof and well known additives in a blender, such as a Henschel or Banbury mixer, to uniformly disperse the said components, at a temperature equal to or higher than the polymer softening temperature, then extruding the composition and pelletizing.

The polymer composition is usually added with additives and/or peroxides, whenever the latter are necessary to obtain the desired MFR.

The said additives added to the above mentioned polymers or polymer composition comprise the common additives to polymers such as pigments, opacifiers, fillers, stabilizers, flame retardants, antacids and whiteners.

The compositions of the present invention are particularly suitable for the preparation of fibres as above said.

Yet another embodiment of the present invention relates to articles, in particular non-woven fabrics, produced with the above-mentioned fibres.

Both fibres and articles produced with the fibres are produced according to known methods. In particular, the fabric of the present invention can be prepared with the well-known processes for the preparation of spun-bond non-woven fabrics, with which the fibres are spread to form directly a fibre web and calendered so as to obtain the non-woven fabric. In a typical spunbonding process, the polymer is heated in an extruder to the melting point of the polyolefin composition and then the molten polyolefin composition is pumped under pressure through a spinneret containing a number of orifices of desired diameter, thereby producing filaments of the molten polymer composition and without subjecting the filaments to a subsequent drawing.

The equipment is characterised by the fact that it includes an extruder with a die on its spinning head, a cooling tower an air suction gathering device that uses Venturi tubes. Underneath this device that uses air speed to control the filaments speed and are usually gathered over a conveyor belt, where they are distributed forming a web according to the well-known method.

When using typical spunbonding machinery, it is usually convenient to apply the following process conditions:
the output per hole ranges from 0.3-0.8 g/min, preferably from 0.4-0.6 g/min;
the molten polymer filaments fed from the face of the spinneret are generally cooled by means of an air flow and are solidified as a result of cooling;
the spinning temperature is generally between 200° and 300° C.

The fabric can be constituted by monolayer or multilayer non-woven fabrics.

In a preferred embodiment, the non-woven fabric is multilayered and at least one layer comprises fibres formed from said polyolefin composition. The other layer may be obtained by spinning processes other than spunbonding and may comprise other types of polymers. The particulars are given in the following examples, which are given to illustrate, without limiting, the present invention.

The following analytical methods have been used to determine the properties reported in the detailed description and in the examples.

Melt Flow Rate:
Determined according to ISO method 1133 (MIL at 230° C. and 2.16 kg, MIE at 190° C. and 2.16 Kg)

MWD and Mw/Mn Determination by Gel Permeation Chromatography (GPC):
Molecular Weight Distribution MWD curves are determined using a Waters 150-C ALC/GPC system equipped with a Infrared detector IR4 POLIMERCHAR and with a TSK column set (type GMHXL-HT) working at 135° C. with 1,2,4-trichlorobenzene as solvent (TCB) (stabilized with 0.1 vol. of 2,6-di-t-butyl p-cresole (BHT)) at flow rate of 1 ml/min. The sample is dissolved in TCB by stirring continuously at a temperature of 140° C. for 1 hour. The solution is filtered through a 0.45 µm Teflon membrane. The filtrate (concentration 0.08-1.2 g/l injection volume 300 µl) is subjected to GPC. Monodisperse fractions of polystyrene (provided by Polymer Laboratories) were used as standard. The universal calibration for PB copolymers was performed by using a linear combination of the Mark-Houwink constants for PS (K=1.21×10-4 dl/g; α=0.706) and PB(K=1.78×10-4 dl/g; α=0.725), PE (K=4.06×10-4 dl/g; α=0.725), PP (K=1.90×10-4 dl/g; α=0.725) weighted for the comonomer content in the copolymer. Data Acquisition and processing for determining MWD and particularly the ratio $\overline{M}_w/\overline{M}_n$ was performed with the commercial software Water Empower v.1.

Comonomer Contents:
Determined by IR spectroscopy or by NMR (when specified).

Particularly for the butene-1 copolymers component (B) the amount of comonomers was calculated from $^{13}$C-NMR spectra of the copolymers of the examples. Measurements were performed on a polymer solution (8-12% by weight) in dideuterated 1,1,2,2-tetrachloro-ethane at 120° C. The $^{13}$C NMR spectra were acquired on a Bruker AV-600 spectrometer operating at 150.91 MHz in the Fourier transform mode at 120° C. using a 90° pulse, 15 seconds of delay between pulses and CPD (WALTZ16) to remove $^1$H-$^{13}$C coupling. About 1500 transients were stored in 32K data points using a spectral window of 60 ppm (0-60 µm).

Copolymer Composition via NMR

Diad distribution is calculated from $^{13}$C NMR spectra using the following relations:

$$PP = 100 I_1/\Sigma$$

$$PB = 100 I_2/\Sigma$$

$$BB = 100 (I_3 - I_{19})/\Sigma$$

$$PE = 100 (I_5 + I_6)/\Sigma$$

$$BE = 100 (I_9 + I_{10})/\Sigma$$

$$EE = 100 (0.5(I_{15} + I_6 + I_{10}) + 0.25(I_{14}))/\Sigma$$

Where $\Sigma = I_1 + I_2 + I_3 - I_{19} + I_5 + I_6 + I_9 + I_{10} + 0.5(I_{15} + I_6 + I_{10}) + 0.25(I_{14})$ The molar content is obtained from diads using the following relations:

$$P(m\%) = PP + 0.5(PE + PB)$$

$$B(m\%) = BB + 0.5(BE + PB)$$

$$E(m\%) = EE + 0.5(PE + BE)$$

$I_1$, $I_2$, $I_3$, $I_5$, $I_6$, $I_9$, $I_6$, $I_{10}$, $I_{14}$, $I_{15}$, $I_{19}$ are integrals of the peaks in the $^{13}$C NMR spectrum (peak of EEE sequence at 29.9 ppm as reference). The assignments of these peaks are made according to J. C. Randal, *Macromol. Chem. Phys.*, C29, 201 (1989), M. Kakugo, Y. Naito, K. Mizunuma and T. Miyatake, *Macromolecules*, 15, 1150, (1982), and H. N. Cheng, *Journal of Polymer Science, Polymer Physics Edition*, 21, 57 (1983). They are collected in Table A (nomenclature according to C. J. Carman, R. A. Harrington and C. E. Wilkes, *Macromolecules*, 10, 536 (1977)).

TABLE A

| I | Chemical Shift (ppm) | Carbon | Sequence |
|---|---|---|---|
| 1 | 47.34-45.60 | $S_{\alpha\alpha}$ | PP |
| 2 | 44.07-42.15 | $S_{\alpha\alpha}$ | PB |
| 3 | 40.10-39.12 | $S_{\alpha\alpha}$ | BB |
| 4 | 39.59 | $T_{\delta\delta}$ | EBE |
| 5 | 38.66-37.66 | $S_{\alpha\gamma}$ | PEP |
| 6 | 37.66-37.32 | $S_{\alpha\delta}$ | PEE |
| 7 | 37.24 | $T_{\beta\delta}$ | BBE |

TABLE A-continued

| I | Chemical Shift (ppm) | Carbon | Sequence |
|---|---|---|---|
| 8 | 35.22-34.85 | $T_{\beta\beta}$ | XBX |
| 9 | 34.85-34.49 | $S_{\alpha\gamma}$ | BBE |
| 10 | 34.49-34.00 | $S_{\alpha\delta}$ | BEE |
| 11 | 33.17 | $T_{\delta\delta}$ | EPE |
| 12 | 30.91-30.82 | $T_{\beta\delta}$ | XPE |
| 13 | 30.78-30.62 | $S_{\gamma\gamma}$ | XEEX |
| 14 | 30.52-30.14 | $S_{\gamma\delta}$ | XEEE |
| 15 | 29.87 | $S_{\delta\delta}$ | EEE |
| 16 | 28.76 | $T_{\beta\beta}$ | XPX |
| 17 | 28.28-27.54 | $2B_2$ | XBX |
| 18 | 27.54-26.81 | $S_{\beta\delta} + 2B_2$ | BE, PE, BBE |
| 19 | 26.67 | $2B_2$ | EBE |
| 20 | 24.64-24.14 | $S_{\beta\beta}$ | XEX |
| 21 | 21.80-19.50 | $CH_3$ | P |
| 22 | 11.01-10.79 | $CH_3$ | B |

Solubility in Xylene (XS) at 25° C.:

2.5 g of polymer are dissolved in 250 ml of xylene, at 135° C., under agitation. After 20 minutes, the solution is cooled to 25° C. under stirring, and then it is allowed to settle for 30 minutes. The precipitate is filtered with filter paper; the solution is evaporated under a nitrogen current, and the residue dried under vacuum at 80° C. until constant weight. Thus, one calculates the percent by weight of polymer soluble (Xilene Solubles at 25° C. =XS 25° C.) from the residue. The insoluble fraction in o-xylene at 0° C. (Xylene Insolubles at 25° C. =XI 25° C.) is:

$$XI\%25°C.=100-XS\%25°C.$$

The percent by weight of polymer insoluble in xylene at ambient temperature (25° C.) is considered the isotactic index of the polymer. This value corresponds substantially to the isotactic index determined by extraction with boiling n-heptane, which by definition constitutes the isotactic index of polypropylene.

Flexural Modulus: (MEF) Determined According to ISO Method 178.

Shore A:

Measured according to ISO 868, loading time 15 sec.

Tensile Properties (on Plaques):

Measured according to ISO 527-Tensile on a 1.9 mm thick plaque obtained by compression molding (at 200° C. with a cooling of 30°/min) of a polymer composition obtained by mixing in a Brabender the relevant copolymer sample with 1% 2,6-di-t-butyl-4-methyl phenol (BHT) at 180° C. Except where otherwise stated all mechanical measurements have been carried out after the specimens have been kept for 10' in autoclave at room temperature and 2 kbar pressure.

Tension Set:

Measured according to ISO 2285.

Intrinsic Viscosity [η]:

Determined in tetrahydronaphthalene at 135° C. (ASTM 2857-70).

Thermal Properties:

The melting points of the Butene-1 polymers (TmII) were measured by Differential Scanning calorimetry (D.S.C.) on an Perkin Elmer DSC-7 instrument, according to the following method.

A weighted sample (5-6 mg) obtained from the polymerization was sealed into aluminum pans and heated at 180° C. with a scanning speed corresponding to 10° C./minute. The sample was kept at 180° C. for 5 minutes to allow a complete melting of all the crystallites. Successively, after cooling to −20° C. with a scanning speed corresponding to 10° C./minute, the peak temperature was taken as crystallization temperature (Tc). After standing 5 minutes at −20° C., the sample was heated for the second time at 180° C. with a scanning speed corresponding to 10° C./min. In this second heating run, the peak temperature, when detected, was taken as the melting temperature of the crystalline form II (TmII) and the area as global melting enthalpy (ΔHfII).

The melting enthalpy after 10 days was measured as follows by using the Differential Scanning calorimetry (D.S.C.) on an Perkin Elmer DSC-7 instrument.

A weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites. The sample was then stored for 10 days at room temperature. After 10 days the sample was subjected to DSC, it was cooled to −20° C., and then it was heated at 200° C. with a scanning speed corresponding to 10° C./min. In this heating run, the peak temperature was taken as the melting temperature (Tm) and the area as global melting enthalpy after 10 days (ΔHf).

X-ray Crystallinity:

The X-ray crystallinity was measured with an X-ray Diffraction Powder Diffractometer using the Cu—Kα1 radiation with fixed slits and collecting spectra between diffraction angle 2Θ=5° and 2Θ=35° with step of 0.1° every 6 seconds.

XRD measurements were performed directly on annealed samples into DSC alluminum pan. The specimens were conditioned in DSC heating up the samples at 10° C./min from room temperature to 180° C., leaving at 180° C. for 5 minutes and then cooling down to 20° C. at 10° C./min. Before to be submitted to XRD investigations the samples were left into DSC pan at room temperature and atmospheric pressure for 10 days.

The obtained diffraction pattern was used to derive all the components necessary for the calculation of the degree of cristallinity expressed as % Cr=100×Ca/Ta where Ta is the area, expressed in counts/sec·2Θ, between the spectrum profile and the baseline and Ca, expressed in counts/sec·2Θ, is the area between the spectrum profile and the amorphos profile.

Tenacity and Elongation at Break of Filaments:

A 100 mm long segment is cut from a 500 m roving. From this segment the single fibres to be tested are randomly chosen. Each single fibre to be tested is fixed to the clamps of an Instron dinamometer (model 1122) and tensioned to break with a traction speed of 20 mm/min for elongations lower than 100% and 50 mm/min for elongations greater than 100%, the initial distance between the clamps being of 20 mm. The ultimate strength (load at break) and the elongation at break are determined The tenacity is derived using the following equation:

Tenacity=Ultimate strength (cN)×10/Titre (dtex).

Elastic Recovery of Filaments:

Elastic recovery was measured with a dynamometer at 23° C. The spun fibre samples were prepared according to extrusion/spinning conditions specified in the examples. Single fibres were randomly chosen as above said from a 500 m roving.

Two deformations cycles were applied to the samples under the following conditions:

First Cycle
  Initial Cross head distance 200 mm,
  cross head speed 3.3 mm/s,
  maximum cross head distance at maximum deformation 400 mm
  relaxation time at maximum cross head distance 60 seconds reverse cross head speed 3.3 mm/second
cross head time at the end of the deformation cycle (cross head distance 200 mm) 180 seconds Second Cycle
Initial Cross head distance 200 mm,
cross head speed 3.3 mm/s,
Percent of residual deformation: it is the percentage value of the deformation recorded when the load cell starts to record a tensional force in the second cycle corresponding to the formula Percent of residual deformation=100×(current crosshead distance−initial crosshead distance)/(initial crosshead distance).

end of test

Elastic recovery (%) is the percentage value of the maximum deformation (400 mm, corresponding to 100% deformation with respect to the initial cross head distance of 200 mm) minus the percent of residual deformation as above defined.

Thermal Bonding Strength:

The thermal bonding strength was measured with a dynamometer on spun fibre samples prepared according to extrusion/spinning conditions specified in the examples. Single fibres were randomly chosen as above said from a 500 m roving.

The samples were subjected to bonding and tested for measuring the bonding strength under the following conditions:

Bonding Condition

| Temperature | 150° C.; (where not differently indicated) |
| filament titre | 4000 dTex |
| number of foldings | to obtain a final titre of 4000 dTex |
| bonding time | 1 Second. |
| bonding pressure | 800N; |

Force Measurement Condition (Average Area Under the Curve, cN)

| cross head speed | 20 mm/min. |
| initial cross head distance | 20 mm |

Polymer Components Used in the Examples and Comparative Examples

The following isotactic propylene homopolymers (A) were used.

| POLYMER | MFR (L) G/10 MIN (230/2.16) | $\overline{M}_w/\overline{M}_n$ | XS 25° C. WT % (CRYSTALLINITY PARAMETER) |
| --- | --- | --- | --- |
| Polymer A1 | 25 | 3.2-3.4 | 2.75-3.75 |
| Polymer A2 | 30 | 3.2-3.4 | 2.75-3.75 |
| Polymer A3 | 25 | 2.3-2.6 | <1.0 |
| Polymer A4 | 30 | 2.3-2.6 | <1.0 |

Polymers A1 to A2 are commercial polymers prepared directly with the reported MFR values and molecular weight distribution by homo polymerising propylene in the presence of a stereo specific Z/N catalyst using the liquid monomer (propylene) as a diluent.

Polymers A3 to A4 are commercial polymers prepared directly with the reported MFR values and molecular weight distribution by homo polymerising propylene in the presence of a metallocene type catalyst as above said.

The following Butene-1 Copolymer (B2) was Prepared and Used:

Synthesis of Metallocene Compound

Dimethylsilanediyl {(1-(2,4,7-trimethylindenyl)-7-(2,5-dimethyl-cyclopenta[1,2-b:4,3-b']-dithiophene)}Zirconium dichloride (Al) was prepared according to WO 01/47939.

Preparation of the Catalytic Solution methylalumoxane (MAO) was supplied by Albemarle as a 30% wt./wt. toluene solution (d=0.92 g/mL) and used as such. Standard triisobutyl aluminium alkyl (TIBA) was supplied by Crompton as pure chemical and further diluted in anhydrous isododecane or cyclohexane, yielding colourless solutions with a concentration of ca. 100 g/L. All chemicals were handled using standard Schlenk techniques.

Catalyst C2A1

(MAO/TIBA, $Al_{TOT}/Zr=400$ mol/mol, $Al_{MAO}/Zr=267$ mol/mol in toluene/isododecane) 62.7 mg of Al were charged at room temperature under nitrogen atmosphere into a 100 mL Schlenk flask, equipped with a magnetic stirrer. At the same time 6.05 mL of MAO Albemarle 30% wt. in toluene (28.8 mmol, $Al_{MAO}/Zr=267$) were charged at room temperature under nitrogen atmosphere into a 50 mL Schlenk flask. Triisobutyl aluminium (TIBA) in cycloexane (25 mL, conc. 114 g/L, 14.4 mmol, $Al_{TJBA}/Zr=133$, $Al_{TOT}/Zr=400$ mol/mol, MAO/TIBA=2/1 mol/mol) was then added at room temperature to MAO, obtaining a colourless solution, which was stirred at r.t. for 1 hour. Finally this solution of alkyls in isododecane/toluene was slowly added at room temperature under nitrogen atmosphere to the metallocene, previously suspended into 14 mL of anhydrous cycloexane. The resulting clear dark-red catalytic solution was stirred for 1-2 hours at room temperature and used as such in polymerizations. The solution concentration was of 100 g of total catalyst (metallocene plus MAO plus TIBA) for each litre of solution, while the concentration of $Z_s39Me_2$ resulted to be 1.39 mg of metallocene for each mL of solution.

Polimerization of B2

The polymerization was carried out in a pilot plant comprising two stirred reactors connected in series in which liquid butene-1, propylene and ethylene constituted the liquid medium. The catalyst system C2-Al was injected into the first 30 liter reactor at a feed rate of 3 g/h and the polymerization was carried out in continuous at a polymerization temperature of 70° C., while hydrogen, 1-butene, propylene and ethylene were fed according to the data reported on table 1. The pressure of the two reactors was kept constant at 24 bar-g. The 1-butene polymer was recovered as melt from the solution and cut in pellets. The polymerization conditions are reported in table 1, the features of the copolymer B2 obtained are reported in table 2.

Polymerization of B1

The run for the preparation of B2 was repeated without a propylene feed. The polymerization conditions are reported in table 1 the features of the copolymer B1 are reported in table 2.

TABLE 1

| | Example | | | |
| --- | --- | --- | --- | --- |
| | B2 | | B1 | |
| | Firs react. | Sec react | Firs react. | Sec react |
| Residence time (min) | 100 | 80 | 100 | 80 |
| C4-feed (kg/h) | 120 | 30 | 120 | 30 |
| C3-feed (kg/h) | 4 | — | — | — |

TABLE 1-continued

| | Example | | | |
|---|---|---|---|---|
| | B2 | | B1 | |
| | Firs react. | Sec react | Firs react. | Sec react |
| C2-feed (kg/h) | 2.5 | — | 3.6 | — |
| H2 feed (g/h) | 0.4 | — | 0.5 | — |
| H2 bulk conc (ppm) | 120 | 90 | 140 | 100 |
| C2C4 reactivity ration | ~7-8 | ~7-8 | ~7-8 | ~7-8 |
| Solution density kg/m³ | 575-585 | 575-585 | 575-585 | 575-585 |
| Polymer concentration wt % | 20-25 | 20-25 | 20-25 | 20-25 |
| Split between the two reactors | 90-100 | 10-0 | 90-100 | 10-0 |
| Yield (kg polymer/g cat feed) | 10000-12000 | | 10000-12000 | |

In the table: C4 = 1-butene; C3 = propylene; C2 = ethylene

TABLE 2

| | Test Method | unit | B2 | B1 |
|---|---|---|---|---|
| C2 content by NMR | | % | 5.5 | 8.5 |
| C3 content by NMR | | | 5.7 | |
| I.V. | | dl/g | 1.7 | 1.8 |
| MFR (E) g/10 min (190/2.61) | ISO 1133 | | 1.81 | 1.5 |
| MEF | ISO 178 | | 27 | <10 |
| Mw/Mn | | | 2.8 | 2.7 |
| Density | | | 0.875 | 0.874 |
| Mechanical Properties [1] | | | | |
| Hardness Shore A | ISO 868 | — | 81 | 54.4 |
| Tensile Strength at Break [2] | ISO 527 | MPa | 10.3 | 6 |
| Elongation at Break [2] | ISO 527 | % | 620 | 700 |
| Tension Set at 100% deformation | ISO 2285 | % | 15 | 14 |
| Melting point (T$_m$II) | | °C. | Nd | Nd |
| Melting enthalpy (ΔH$_f$II) | | J/g | Nd | Nd |
| Melting enthalpy after 10 days (ΔH$_f$) | | J/g | 17 | 6.7 |
| X-ray crystallinity | | % | 17 | 9 |

[1] Measured in compression molded samples, aged two weeks prior to testing
[2] 5A specimen type, strain rate of 500 mm/min
Nd = not detectable

EXAMPLES 1-12

It was prepared a polymer composition by mixing and extruding the polymer components listed in Table 3 and the additives mentioned below in a Leonard 25 extruder under the following conditions:

melt temperature of the polymer composition (reported in the table 3);
Length: 70 cm
Diameter: 25 mm
Compression ratio: 3

The composition contained 0.03 wt % of calcium stearate and 0.08 wt % of Irgafos 168.

The polymer components and properties of the composition thus obtained are reported in Table 3.

The composition was then subjected to spinning by operating at the conditions set forth below:

spinning temperature equal to the melt temperature of the polymer composition;
hole diameter: 0.6 mm;
length/diameter (1/d): 5
titre: 2.2 dtex
Spinning speed: 2700 m/min The spun fibres were gathered and tested. In Table 3 the properties of the fibres are reported.

REFERENCE EXAMPLES 1 AND 2 (1R,2R)

Example 1 was repeated with the base material polymer component (A) as a reference. Polymers A1 and A2 without addition of the butene-1 copolymer (B) were spun.

In Table 3 the properties of the fibres are reported.

TABLE 3

| Components and Properties | | 1R | 2R | 1 | 2 | 3 | 4 | 5 | 6 | 7 | 8 | 9 | 10 | 11 | 12 |
|---|---|---|---|---|---|---|---|---|---|---|---|---|---|---|---|
| Polymer A, wt % | A1 | 100 | | 80 | 70 | 60 | | | | 80 | 70 | 60 | | | |
| | A2 | | 100 | | | | 80 | 70 | 60 | | | | 80 | 70 | 60 |
| MFR of polymer A, g/10 min | | 25 | 30 | | | | | | | | | | | | |
| Polymer, wt % | B2 | | | 20 | 30 | 40 | 20 | 30 | 40 | | | | | | |
| Polymer, wt % | B1 | | | | | | | | | 20 | 30 | 40 | 20 | 30 | 40 |
| Spinning Condition and Properties of the Composition fibres | | | | | | | | | | | | | | | |
| Maximum spinning speed, m/min | | 4500 | 4500 | 4200 | 4200 | 4200 | 4200 | 4200 | 3900 | 3300 | 3300 | 3300 | 4200 | 4200 | 3900 |
| Melting Temperature, °C. | | 263 | 258 | 263 | 263 | 263 | 258 | 258 | 258 | 263 | 263 | 263 | 263 | 263 | 263 |
| Tenacity, cN/dtex | | 28.2 | 30.2 | 27.0 | 26.2. | 22.6 | 22.60 | 29.1 | 27.7 | 23.4 | 24.2 | 24.0 | 23.2 | 21.9 | 22.9 |
| Elongation at break, % | | 225 | 215 | 175 | 145 | 125 | 140 | 130 | 145 | 155 | 170 | 140 | 140 | 115 | 125 |
| Elastic recovery at 100% def. | | 32.1 | 30.9 | 30.7 | 35.2 | 40.9 | 33.2 | 34.7 | 40.3 | 32.8 | 35.7 | 39.0 | 31.7 | 36.4 | 41.4 |

TABLE 3-continued

| Components and Properties | 1R | 2R | Examples 1 | 2 | 3 | Examples 4 | 5 | 6 | Examples 7 | 8 | 9 | Examples 10 | 11 | 12 |
|---|---|---|---|---|---|---|---|---|---|---|---|---|---|---|
| Thermal Bonding strength at 150° C. | 110 | 115 | 185 | 150 | 185 | 140 | 150 | 180 | 160 | 140 | 155 | 150 | 105 | 95 |

COMPARATIVE EXAMPLE 13-15

Example 1 was repeated except that instead of the butene-1 copolymer (B) a polypropylene based plastomer commercialized under the tradename Vistamaxx 4200 by Exxon, was added. The polymer components and their amounts are reported in Table 4.

TABLE 4

| Components and Properties | | Reference 1R | Comparative Examples 13 | 14 | 15 |
|---|---|---|---|---|---|
| Polymer A, wt % | A1 | 100 | 80 | 70 | 60 |
| MFR of polymer A, g/10 min | | 25 | | | |
| Polymer Vistamaxx, wt % | | | 20 | 30 | 40 |
| Spinning Condition and Properties of the Composition fibres | | | | | |
| Maximum spinning speed, m/min | | 4500 | 4500 | 4200 | 3900 |
| Melting Temperature, ° C. | | 263 | 263 | 263 | 263 |
| Tenacity, cN/dtex | | 28.2 | 21.4 | 25.0 | 24.3 |
| Elongation at break, % | | 225 | 160 | 165 | 205 |

TABLE 4-continued

| Components and Properties | Reference 1R | Comparative Examples 13 | 14 | 15 |
|---|---|---|---|---|
| Elastic recovery at 100% def. | 32.1 | 26.8 | 27.4 | 28.9 |
| Thermal Bonding strength (150° C.) | 110 | 135 | 235 | 285 |

EXAMPLE 16-26

It was prepared a polymer composition by mixing and extruding the polymer components listed in Table 5 and the additives mentioned below in a Leonard 25 extruder under the same conditions used for examples 1-12.

The polymer components and properties of the composition thus obtained are reported in Table 5.

The composition was then subjected to spinning by operating at the same conditions set forth for examples 1-12.

The spun fibres were gathered and tested. In Table 5 the properties of the fibres are reported.

REFERENCE EXAMPLES 3 AND 4 (3R,4R)

It was prepared a polymer composition with Polymers A3 and A4 as polymer component (A) without addition of the butene-1 copolymer (B) as a reference.

The polymer components and their amounts are reported in Table 5.

TABLE 5

| Components and Properties | | 3R | 4R | Examples 16 | 17 | Examples 18 | 19 | 20 | Examples 21 | 22 | 23 | Examples 24 | 25 | 26 |
|---|---|---|---|---|---|---|---|---|---|---|---|---|---|---|
| Polymer A, wt % | A3 | 100 | | 80 | 70 | | | | 80 | 70 | 60 | | | |
| | A4 | | 100 | | | 80 | 70 | 60 | | | | 80 | 70 | 60 |
| MFR of polymer A, g/10 min | | 25 | 30 | | | | | | | | | | | |
| Polymer, wt % | B2 | | | 20 | 30 | 20 | 30 | 40 | | | | | | |
| Polymer, wt % | B1 | | | | | | | | 20 | 30 | 40 | 20 | 30 | 40 |
| Spinning Condition and Properties of the fibres obtained from the composition | | | | | | | | | | | | | | |
| Maximum spinning speed, m/min | | 4500 | 4500 | 4200 | 3900 | 4200 | 4200 | 4200 | 3900 | 3900 | 3900 | 3900 | 3900 | 3900 |
| Melting Temperature, ° C. | | 258 | 258 | 263 | 263 | 258 | 258 | 258 | 263 | 263 | 263 | 263 | 263 | 263 |
| Tenacity, cN/dtex | | 32.9 | 29.9 | 31.3 | 26.7 | 26.0 | 25.8 | 25.3 | 28.0 | 25.8 | 24.4 | 23.5 | 24.6 | 26.0 |
| Elongation at break, % | | 185 | 140 | 180 | 145 | 165 | 135 | 120 | 140 | 145 | 140 | 160 | 155 | 145 |
| Elastic recovery (100% def.) | | 37 | 30 | 33.5 | 39 | 32.8 | 38.3 | 44.6 | 33.4 | 41.0 | 48.2 | 36.1 | 40.3 | 47.7 |

TABLE 5-continued

| Components and Properties | | 3R | 4R | Examples 16 | 17 | Examples 18 | 19 | 20 | Examples 21 | 22 | 23 | Examples 24 | 25 | 26 |
|---|---|---|---|---|---|---|---|---|---|---|---|---|---|---|
| Thermal Bonding strength | 150° C. | 70 | 150 | melt | melt | melt | melt | melt | melt | melt | melt | melt | melt | melt |
| | 140° C. | No bond | no bond | 375 | 620 | melt | melt | melt | 255 | 380 | 440 | 380 | 360 | 420 |
| | 125° C. | No bond | no bond | 105 | 210 | 120 | 215 | 260 | 110 | 120 | 95 | n.a. | n.a. | n.a. | n.a. not available

COMPARATIVE EXAMPLE 27

Example 1 was repeated except that instead of the butene-1 copolymer (B) according to the invention it was added a semi-crystalline polybutene homopolymer Bc (Melt flow rate (MFR) 0.4 g/10 min (190° C./2.16 kg); Flexural modulus 450 MPa (ISO178); TmII=115.9). The polymer components and their amounts are reported in Table 6 together with ex 1, 7 and reference 1R for comparison.

TABLE 6

| Components and Properties | | 1R | Examples 1 | 7 | Comparative Example 27 |
|---|---|---|---|---|---|
| Polymer A, wt % | A1 | 100 | 80 | 80 | 80 |
| MFR of polymer A, g/10 min | | 25 | | | |
| Polymer, wt % | B2 | | 20 | | |
| | B1 | | | 20 | |
| | Bc | | | | 20 |
| Spinning Condition and Properties of the Composition fibres | | | | | |
| Maximum spinning speed, m/min | | 4500 | 4200 | 3300 | 3600 |
| Melting Temperature, ° C. | | 263 | 263 | 263 | 255 |
| Tenacity, cN/dtex | | 28.2 | 27.0 | 23.4 | 22.8 |
| Elongation at break, % | | 225 | 175 | 155 | 195 |
| Elastic recovery at 100% def. | | 32.1 | 30.7 | 32.8 | 28.0 |
| Thermal Bonding strength at 150° C. | | 110 | 185 | 160 | 225 |
| Thermal Bonding strength at 140° C. | | | | | 115 |

The comparative examples show that fibres obtained with the propylene polymer (A) modified by adding a butene-1 copolymer (B) according to the invention have higher tenacity and higher elastic recovery than propylene polymer (A) modified with a crystalline polybutene-1 polymer. Particularly the elastic recovery is higher than 30% for the fibre blends according to the invention. When component (B) is the more preferred terpolymer component (B2) it is observed the further advantage that fiber are obtainable at higher spinning speed (preferably higher than 4000 m/min). Higher spinning speed means an increased fiber production rate.

The invention claimed is:

1. An article comprising:
a polyolefin composition comprising:
A) 20-95 wt. % of a propylene homo-polymer or a copolymer of propylene, ethylene and an alpha-olefin having 4-10 carbon atoms containing 85 wt. % or more of propylene, having an isotactic index of at least 80, wherein component A) is homogenous and has a molecular weight distribution ranging from 2 to 8; and
B) 5-80 wt. % of a copolymer of butene-1, ethylene and an alpha-olefin having 3-10 carbon atoms having:
(i) a content of butene-1 derived units of at least 80 wt. %,
(ii) a molecular weight distribution Mw/Mn of less than 3, and
(iii) a flexural modulus no higher than 60 MPa.

2. The article of claim 1, wherein the copolymer component B) has a content of ethylene derived units ranging from 5 wt. % to 10 wt. %.

3. The article of claim 1, wherein the copolymer component B) is a butene-1/ethylene/propylene terpolymer having a content of from 3 to 10 wt. % of ethylene derived units in the polymer chain, and from 2 to 10 wt. % of propylene derived units in the polymer chain.

4. The article of claim 1, wherein the article is a fiber.

5. The article of claim 1, wherein the article is a non-woven fabric.

6. The article of claim 1, wherein the article is a diaper.

* * * * *